United States Patent
Chen et al.

(10) Patent No.: US 7,733,452 B2
(45) Date of Patent: Jun. 8, 2010

(54) MATERIALS FOR PROMOTING ALIGNMENT OF LIQUID CRYSTALS ON $SIO_x$ AND OTHER SUBSTRATES

(75) Inventors: Cheng Chen, Kent, OH (US); Philip J. Bos, Hudson, OH (US); James E. Anderson, Cuyahoga Falls, OH (US)

(73) Assignee: Kent State University, Kent, OH (US)

( * ) Notice: Subject to any disclaimer, the term of this patent is extended or adjusted under 35 U.S.C. 154(b) by 69 days.

(21) Appl. No.: 11/123,519

(22) Filed: May 6, 2005

(65) Prior Publication Data

US 2006/0250557 A1  Nov. 9, 2006

(51) Int. Cl.
*G02F 1/1333* (2006.01)

(52) U.S. Cl. .................. 349/135; 349/178; 349/130; 349/123; 428/1.1

(58) Field of Classification Search .......... 428/1.1; 349/123, 191, 130, 178, 158, 127, 138, 135, 349/187
See application file for complete search history.

(56) References Cited

U.S. PATENT DOCUMENTS

| | | | |
|---|---|---|---|
| 3,656,834 A | 4/1972 | Haller et al. | |
| 3,848,966 A | 11/1974 | Smith et al. | |
| 3,919,105 A * | 11/1975 | Katagiri et al. | 252/299.5 |
| 3,972,589 A | 8/1976 | Skelly et al. | |
| 3,994,567 A | 11/1976 | Matsuo et al. | |
| 4,437,731 A | 3/1984 | Sudo et al. | |
| 5,965,060 A * | 10/1999 | Tarumi et al. | 252/299.63 |
| 6,333,081 B1 | 12/2001 | Horikiri et al. | |
| 2004/0105066 A1 | 6/2004 | Tsuda | |
| 2004/0185185 A1 | 9/2004 | Kitson et al. | |
| 2005/0122456 A1 * | 6/2005 | Shuto et al. | 349/127 |

FOREIGN PATENT DOCUMENTS

| EP | 1 170353 A2 | 1/2002 |
|---|---|---|
| WO | WO 02/93243 A1 | 11/2002 |

OTHER PUBLICATIONS

Minhua Lu, K.H. Yang, T. Nakasogi, S.J. Chey, "29.4: Homeotropic Alignment by Single Oblique Evaporation of $SiO_2$ and Its Application to High Resolution Microdisplays", SID 00 Digest, pp. 446-449 (2000).

* cited by examiner

*Primary Examiner*—Thoi V Duong
(74) *Attorney, Agent, or Firm*—Fay Sharpe LLP

(57) ABSTRACT

The present invention relates to a liquid crystal alignment agent, a liquid crystal device produced by using the liquid crystal alignment agent thereof, and a method for alignment of liquid crystal molecules by using the liquid crystal alignment agent. In more detail, the present embodiments relates to a novel liquid crystal alignment agent used in a method of aligning liquid crystal molecules, wherein the agent includes a molecule having a highly polar functional group grafted onto an end of the molecule.

14 Claims, 2 Drawing Sheets

MATERIALS FOR PROMOTING ALIGNMENT OF LIQUID CRYSTALS ON SIO$_x$ AND OTHER SUBSTRATES

BACKGROUND

The present exemplary embodiments relate to materials for promoting vertical alignment of liquid crystals. It finds particular application in conjunction with the vertical alignment of liquid crystals on SiO$_x$ and other substrates, and will be described with particular reference thereto. However, it is to be appreciated that the present exemplary embodiment is also amenable to other like applications.

Liquid crystal (LC) materials are rod-like molecules which have different optical properties along their long and short axes. The molecules exhibit some long range order so that locally they tend to adopt similar orientations to neighboring molecules. The local orientation of the long axes of the molecules is referred to as the "director". There are three types of LC materials: nematic, cholesteric (chiral nematic), and smectic. For a liquid crystal to be used in a display device, it must typically be made to align in a defined manner in the "off" state and in a different defined manner in the "on" state, so that the display has different optical properties in each state. Two principal alignments are homeotropic or vertical (where the director is substantially perpendicular to the plane of the cell walls) and homogeneous or planar (where the director is inclined substantially parallel to the plane of the cell walls). In practice, planar alignments may be tilted with respect to the plane of a cell wall, and this tilt can be useful in aiding switching.

Homeotropic alignment of liquid crystals on substrates is useful in liquid crystal displays, rear projection TVs, optical communication, and other applications. Usually in this mode liquid crystals with negative dielectric anisotropies are employed because they are electrically switchable when molecules are aligned vertically. Numerous methods have been developed to achieve vertical alignment of liquid crystals.

For example, sputtered SiO$_2$, evaporated SiO$_x$, SiO$_x$ evaporation followed by alcohol treatment, and polyimide thin layers have all been used. Among these methods, SiO$_x$ evaporation and SiO$_2$ sputtering attracts much interest because they are non-contact and rub-free.

LC homeotropic alignment is a difficult process to control, typically using a chemical treatment of the surface, such as lecithin or a chrome complex. These chemical treatments may not be stable over time, and may not adhere very uniformly to the surface to be treated. Homeotropic alignment has been achieved by the use of special polyimide resins such as those developed by Japan Synthetic Rubber Co. These polyimides need high temperature curing which may not be desirable for low glass transition plastic substrates. Inorganic oxide layers may induce homeotropic alignment if deposited at suitable angles. This requires vacuum processes which are subject to the problems discussed above in relation to planar alignment. Another possibility for producing homeotropic alignment is to use a low surface energy material such as PTFE. However, PTFE gives only weak control of alignment angle and may be difficult to process.

However, it is still difficult to vertically align many liquid crystals on them. We found a group of materials that promote vertical alignment if mixed with other liquid crystals at an appropriate concentration range.

Previous researchers have reported that liquid crystals with negative dielectric anisotropy tend to align homeotropically on deposited inorganic surfaces while those with positive dielectric anisotropy tend to align homogeneously. Minhua Lu, K. H. Yang, T. Nakasogi, and S. J. Chey, SID Digest, 2000, pp 446-449.

Specifically, the researchers found that several liquid crystals with negative dielectric anisotropy could be aligned homeotropically on evaporated SiO$_x$ and sputtered SiO$_2$ substrates. The paper further pointed out that due to the smoothness of the SiO$_x$ surface, steric forces play only minor roles in the alignment of liquid crystals. Therefore, the van der Waals forces are the keys. This research also suggested a model to explain this effect by taking the induced dipole-dipole interaction into account in calculating the anisotropy of liquid crystal polarizabilities. This model was expressed using the equation:

$$V \propto \frac{\varepsilon_{lc}-1}{\varepsilon_{lc}+2} * \frac{\varepsilon_{SiO}-1}{\varepsilon_{SiO}+1} * r^{-6}$$

This model predicts that liquid crystals with positive dielectric anisotropy should align homogeneously on SiO$_x$ surfaces while liquid crystals with negative dielectric anisotropy should align homeotropically on SiO$_x$ surfaces. This has been experimentally proved in many cases.

However, it has been shown that while liquid crystals with moderate values of a negative dielectric anisotropy typically align as predicted, there are at least some liquid crystals that have a large negative dielectric anisotropy that are difficult to align vertically on SiO$_x$ or even on polyimide substrates. This is problematic because large negative values of the dielectric anisotropy are desired to enhance the electro-optical response of devices.

It is desirable to have a more controllable and manufacturable alignment method for LC devices. Thus, it would be helpful to develop a method for promoting vertical alignment of any liquid crystal exhibiting negative dielectric anisotropy on inorganic substrates. and to be able to control the type of alignment through the simple addition of a specific alignment promoting material to the liquid crystal.

BRIEF DESCRIPTION

In accordance with one aspect of the present exemplary embodiment, there is provided a liquid crystal device including a first substrate and a second substrate; a layer of liquid crystal material positioned between the substrates; and electrodes for applying an electric field across at least a portion of the liquid crystal material; wherein the liquid crystal material includes a liquid crystal having negative dielectric anisotropy and an alignment agent having molecules with one or more polar functional groups grafted onto at least one end portion thereof.

In accordance with a second aspect of the present exemplary embodiments, there is provided a method for preparing a vertically aligned liquid crystal display wherein a liquid crystal is homeotropically aligned at zero applied voltage, the method including the steps of providing first and second substrates, providing first and second electrodes for inducing a voltage across said substrates, and providing a liquid crystal material between said substrates, wherein the liquid crystal material includes a liquid crystal having negative dielectric anisotropy and an alignment agent having molecules with one or more polar functional groups grafted onto at least one end portion thereof.

DETAILED DESCRIPTION

A vertical alignment mode liquid crystal display device having an improved viewing angle characteristic is provided. The liquid crystal display device uses a liquid crystal having a negative anisotropic dielectric constant, and orientations of the liquid crystal are vertical or near vertical to substrates when no voltage is applied, almost horizontal when a predetermined voltage is applied, and oblique when an intermediate voltage is applied.

Generally, an LCD has a structure having a liquid crystal layer that is sandwiched between two substrates. An electric field is applied to the liquid crystal layer to control the alignment of the liquid crystal molecules, ultimately controlling the transmittance of incident light. In a vertically aligned (VA) LCD, the liquid crystal molecules are aligned perpendicular to the substrates when an electric field is not applied. In case two polarizer films are arranged with their polarizing directions perpendicular to each other, the linearly polarized light passing through the first polarizer film is completely blocked by the second polarizer film in the absence of an electric field. The complete blockage of lights exhibits a very low brightness in an "off" state of the normally black mode. This helps a VA LCD obtain a relatively higher contrast ratio than that of the conventional TN liquid crystal display.

The liquid crystal device of the current embodiments includes lower and upper substrates arranged substantially in parallel with a predetermined gap therebetween. Liquid crystal material is injected between the lower and upper substrates to form a liquid crystal layer. The liquid crystal material is comprised of liquid crystal molecules and an alignment agent, which may be a liquid crystal having grafted polar groups. In one embodiment, a long axis of liquid crystal molecules is oriented normal to the lower and upper substrates. Both the lower and upper substrates are transparent material such as glass.

Figure 1:
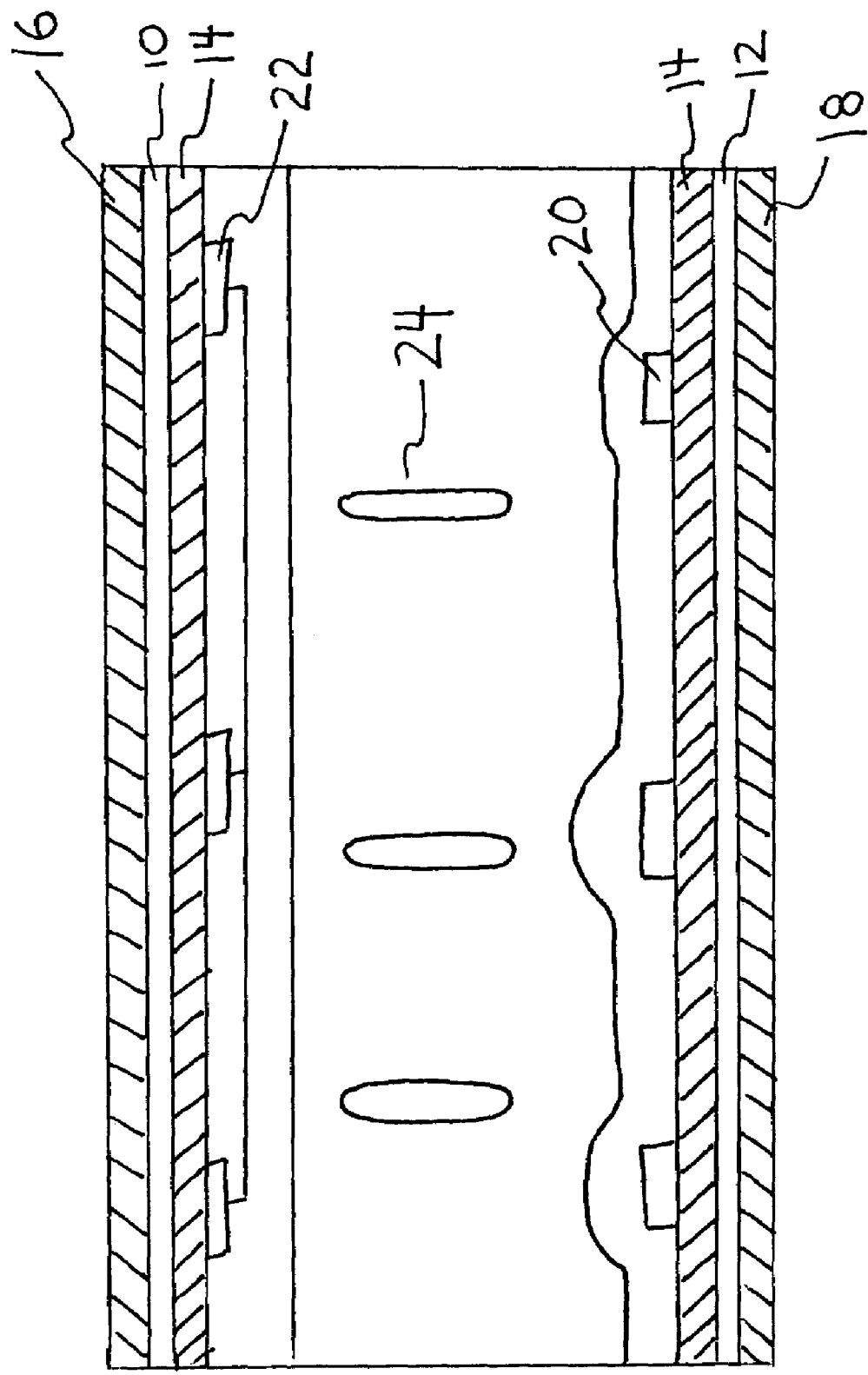
FIG. 1 is a side perspective view of a vertically aligned liquid crystal device according to one embodiment.

More specifically, and with reference to FIG. 1, there is provided a liquid crystal device according to one embodiment. This device may be used in, e.g., a vertically aligned liquid crystal display (VA-LCD). The device includes first and second transparent substrates 10, 12. The substrates may be made from glass or other material conventionally used in liquid crystal devices. A layer 14 of SiO, $SiO_2$, $SiN_x$, $SiO_x$ or other inorganic material used in vertically aligned liquid crystal display devices is deposited onto the glass substrates via sputtering, evaporation or other method. Polarization plates 16, 18 may be positioned adjacent each substrate. A pair of electrodes 20, 22 may be used to induce a voltage across at least a portion of the substrates.

Positioned between the substrates is a layer of liquid crystal material. The liquid crystal material includes a liquid crystal 24 having negative dielectric anisotropy as well as an alignment agent (not shown) for inducing a desired alignment of the liquid crystal. In one embodiment, the alignment agent used to induce homeotropic alignment is a liquid crystal.

The alignment agent in the present embodiments is a liquid crystal molecule having grafted thereon a strongly polar group. In a first embodiment, the strongly polar group is grafted onto an end of the molecule.

In one embodiment, am alignment agent with very strongly polar group at the molecular end(s) is mixed with a target liquid crystal having negative dielectric anisotropy to promote vertical alignment of the liquid crystal on $SiO_x$, polyimide, or other inorganic surfaces for use in vertically aligned liquid crystal displays. Particularly effective polar groups include cyano or cyano-like groups such as isocyano. It is contemplated that other strongly polar groups should work as well.

The device relies on a change of birefringence induced by tilting the molecules with the application of an applied voltage which affects the polarization of light. When the device is in an off state, the liquid crystal molecules are aligned vertically, resulting in a dark state when viewed through crossed polarizers.

A method of manufacturing the liquid crystal device of the first embodiment will be described with reference to FIG. 1. First, a gate electrode and gate wiring, which comprise a single layer or multiple layers of a metal such as Cr or ITO, are formed on a pair of transparent substrates such as glass by a process such as sputtering and a photoresist step. An alignment layer comprising silicon oxide, silicon nitride or other inorganic material is formed on the electrode by a process such as thermal evaporation in a vacuum). The liquid crystal material including the target liquid crystal and the alignment agent is then injected into the space between the substrates.

Any liquid crystal having a negative dielectric anisotropy is contemplated for use in the present invention as the first liquid crystal, but especially those that have a high value of their negative dielectric anisotropy. Such liquid crystals are known in the art and include, for example, those used in vertically aligned liquid crystal displays (VA-LCD). For example, commercial products from Merck, Chisso, and BDH such as ZLI-4788-100, ZLI-4788-000, MLC-6610, ZLI-4330 etc. and their mixtures. Another example is compound VI as described below having lateral dipole groups. One exemplary liquid crystal that may be used in the present embodiments is ZLI-4788-000, a mixture commercially available from Merck.

Although not intended to be limiting, the liquid-crystal mixture may have a nematic phase range of at least 80 K, a clearing point above 60° C., in particular above 70° C., and a maximum flow viscosity of 30 $mm^2s^-$ at 20° C.

Likewise, in certain embodiments, the liquid-crystal may have a dielectric anisotropy of about −6, preferably from about −5.0 to −20.0. The rotational viscosity y may be <225 mPa s, in particular <180 mPa s.

In certain further embodiments, the birefringence Δn of the liquid-crystal may generally be between 0.04 and 0.15, and preferably for some applications like microdisplays, it may be as large as possible.

The liquid-crystal mixture may also contain further additives known to the person skilled in the art and described in the literature. For example, additives may be included in order to improve the conductivity or substances can be added in order to modify the dielectric anisotropy, the viscosity and/or the alignment of the nematic(^) phases. The liquid-crystal mixture may also contain UV stabilizers and antioxidants.

We found by adding some liquid crystal or liquid crystal-like materials containing cyano, cyano-like or other strongly polar groups at the end(s) of the molecular long axis to target liquid crystals (i.e. liquid crystals we want to align homeotropically), vertical alignment can be easily achieved. Often, those additives are rod-like liquid crystals with positive dielectric anisotropy which align homogeneously themselves on $SiO_x$ surfaces. Surprisingly however, when they are mixed with the target liquid crystals at an appropriate concentration, the mixture gives vertical alignment. This is a contradiction to what previous researchers understood and concluded, as discussed above.

Specifically, the target liquid crystals can be any liquid crystal compounds or mixtures that have negative dielectric anisotropy, but preferably have a large negative dielectric anisotropy (possibly resulting from some of the molecules in the mixture having lateral dipole moments).

In one embodiment the alignment agent additives can be described as molecules containing: a rigid body consisting of a few phenyls and/or cyclohexyls, a flexible tale at one end and a cyano, cyano-like or other polar group at another end. These alignment agents are preferably liquid crystals themselves. Some non-limiting examples of suitable liquid crystal alignment agent molecules are shown below. The amount of alignment agent in the liquid crystal mixture can range from about 2% to about 60% by weight.

Exemplary alignment agents for inducing homeotropic alignment of the target liquid crystal include:

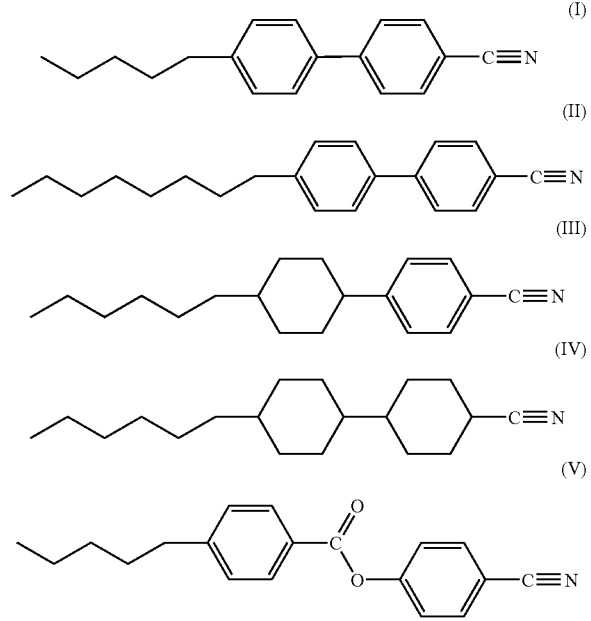

An exemplary liquid crystal that may be a component of the target liquid crystal material that has a large negative dielectric anisotropy is:

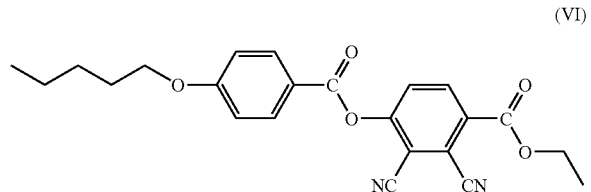

Although not wishing to be bound by any particular theory, Applicants believe that this observed effect is due to static or other type forces promoting the cyano or other highly polar groups to align perpendicularly to the $SiO_x$ or other surface when mixed with a negatively anisotropic liquid crystal, such as ZLI-4788-000. Compounds (I) and (II) above are more commonly known as 5CB (or K15) and 8CB, respectively, and are cyanobiphenyl liquid crystals available from Merck, Aldrich and other chemical companies. In the case of 5CB, 8CB, as well as other similar molecules, the cyano groups are located at a longitudinal end of the molecules, inducing a vertical alignment of the target liquid crystal.

Example 1

SiO was thermally evaporated onto glass substrates at 45 degree normal to the substrate. The thickness of the SiO layer was approximately 100 nm. Cells were made from coated substrates with top and bottom substrates having evaporation direction opposite to each other. The liquid crystal used was ZLI-4788-000, a mixture commercially available from Merck. The dielectric anisotropy of ZLI-4788-000 is −5.7. According to Lu's research, this material should align vertically on $SiO_x$ substrates due to its high negative dielectric anisotropy. However, when the liquid crystal was introduced into the cell by vacuum capillary filling, no uniform alignment could be obtained. Heating the cells to isotropic and slowly cooling down likewise did not prove to help.

Figure 2:
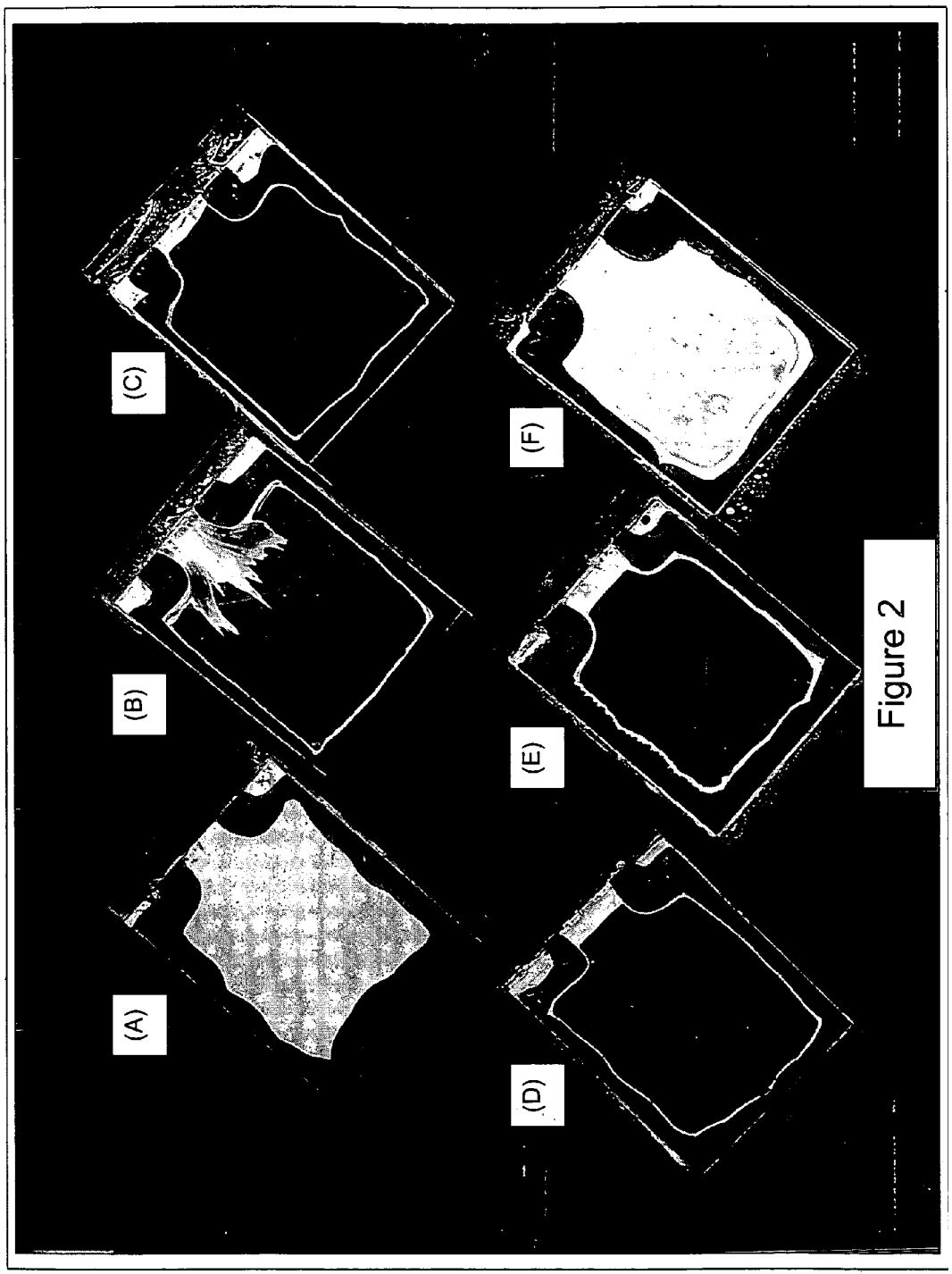
FIG. 2 are photographs showing the effect of the addition of alignment agents to a liquid crystal in one embodiment.

The alignment agent in this example was 5CB. The dielectric anisotropy of 5CB is about +11.3. When only 5CB was filled into previously described cells, planar alignment was obtained. However, when 5CB was mixed into ZLI-4788-000 at various weight percentages from 5% to 50% the new mixtures align vertically in the previously described cells. Cells filled with 5CB, ZLI-4788-000 and mixtures thereof were examined between crossed polarizers. FIG. 2 shows the results of these cells. The contents of the various cells correspond as follows.

| Cell | % 5CB | % ZLI-4788-000 |
|---|---|---|
| A | 100 | 0 |
| B | 50 | 50 |
| C | 25 | 75 |
| D | 25 | 75 |
| E | 10 | 90 |
| F | 0 | 100 |

The photographs are taken with cells placed between two crossed polarizers. For vertical alignment cells look dark and for planar alignment cells look bright(white). The picture shows that although both the host liquid crystal and the alignment agent assume planar alignment on $SiO_x$, when they are mixed at proper ratio they form vertical alignment.

In general then, it can be summarized that blending of any liquid crystal or liquid crystal mixture that has negative dielectric anisotropy with liquid crystal(s) with very strong polar group at molecular end(s) promotes vertical alignment on $SiO_x$ and polyimide surfaces. Likewise and more broadly, it may be inferred that adding materials that have large dipole moments on one end, but may not be liquid crystals in their pure form, may also be examples of an suitable alignment agent.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A liquid crystal device comprising:
a first substrate and a second substrate;
a layer of liquid crystal material positioned between said substrates; and
electrodes for applying an electric field across at least a portion of said liquid crystal material; wherein said liquid crystal material comprises a liquid crystal having negative dielectric anisotropy and a liquid crystal alignment agent comprising at least one of:

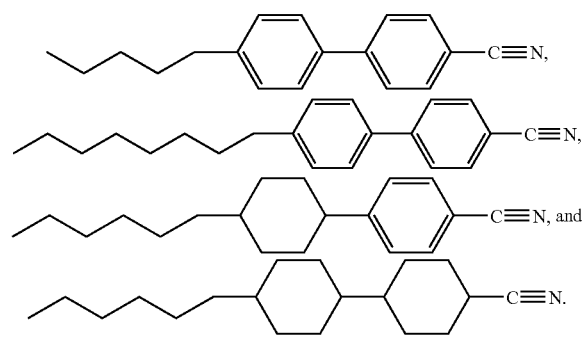

2. A liquid crystal device according to claim 1, wherein said alignment agent induces homeotropic alignment of said liquid crystal.

3. A liquid crystal device according to claim 1, wherein said first and second substrates are coated with an inorganic alignment layer.

4. A liquid crystal device according to claim 3, wherein said inorganic alignment layer comprises $SiO_x$.

5. A liquid crystal device according to claim 1, wherein said first and second substrates comprise polyimide.

6. A liquid crystal device according to claim 1, wherein said alignment agent comprises from about 2 to about 60% by weight of said liquid crystal material.

7. A liquid crystal device according to claim 1, wherein said liquid crystal device is suitable for use in a vertically aligned liquid crystal display.

8. A liquid crystal device according to claim 1, wherein said liquid crystal having negative dielectric anisotropy has a dielectric anisotropy of from −5.0 to −20.0.

9. A liquid crystal device according to claim 1, wherein said liquid crystal having negative dielectric anisotropy has a rotational viscosity of <225 mPa.

10. A method for preparing a vertically aligned liquid crystal display wherein a liquid crystal is homeotropically aligned at zero applied voltage, the method including the steps of: providing first and second substrates, providing first and second electrodes for inducing a voltage across said substrates, and providing a liquid crystal material between said substrates, wherein the liquid crystal material includes a liquid crystal having negative dielectric anisotropy and a liquid crystal alignment agent comprising at least one of:

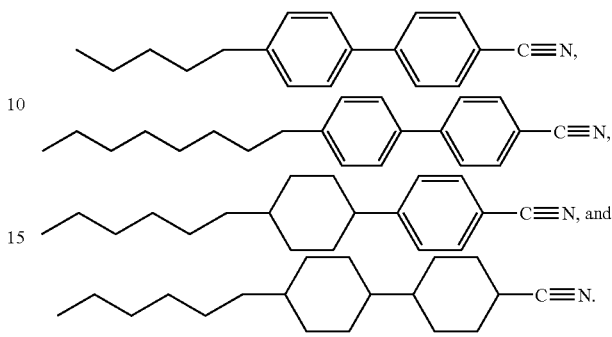

11. A method according to claim 10, wherein at least one of said first and second substrates are coated with an inorganic alignment layer.

12. A method according to claim 11, wherein said inorganic alignment layer comprises $SiO_x$.

13. A method according to claim 10, wherein said first and second substrates comprise polyimide.

14. A liquid crystal device comprising:
a first substrate and a second substrate;
a layer of liquid crystal material positioned between said substrates; and
electrodes for applying an electric field across at least a portion of said liquid crystal material; wherein said liquid crystal material comprises a liquid crystal having negative dielectric anisotropy and an alignment agent comprising at least one compound selected from the group consisting of:

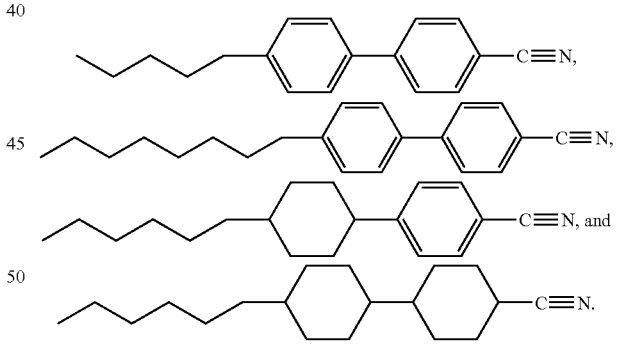

* * * * *